UNITED STATES PATENT OFFICE.

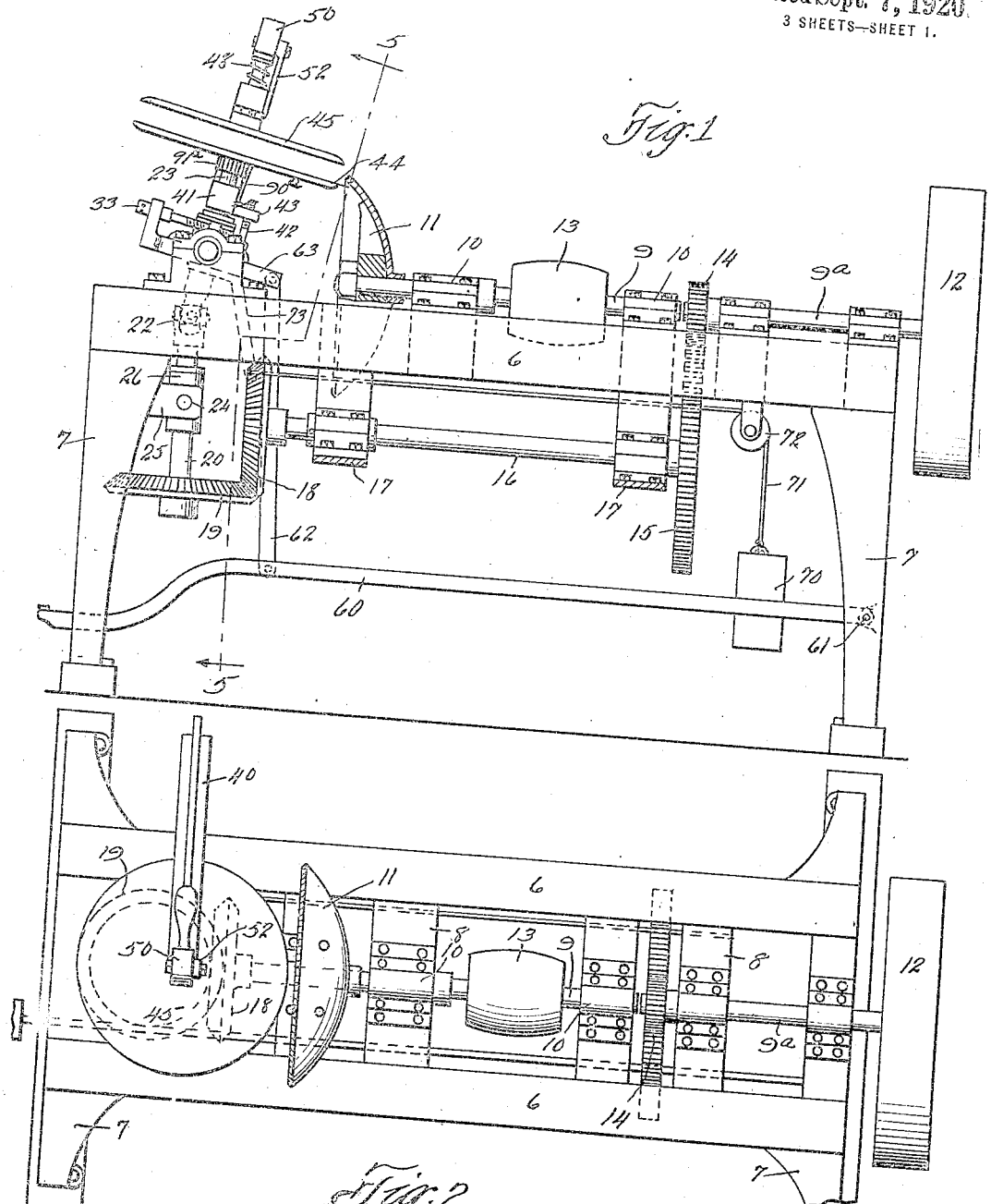

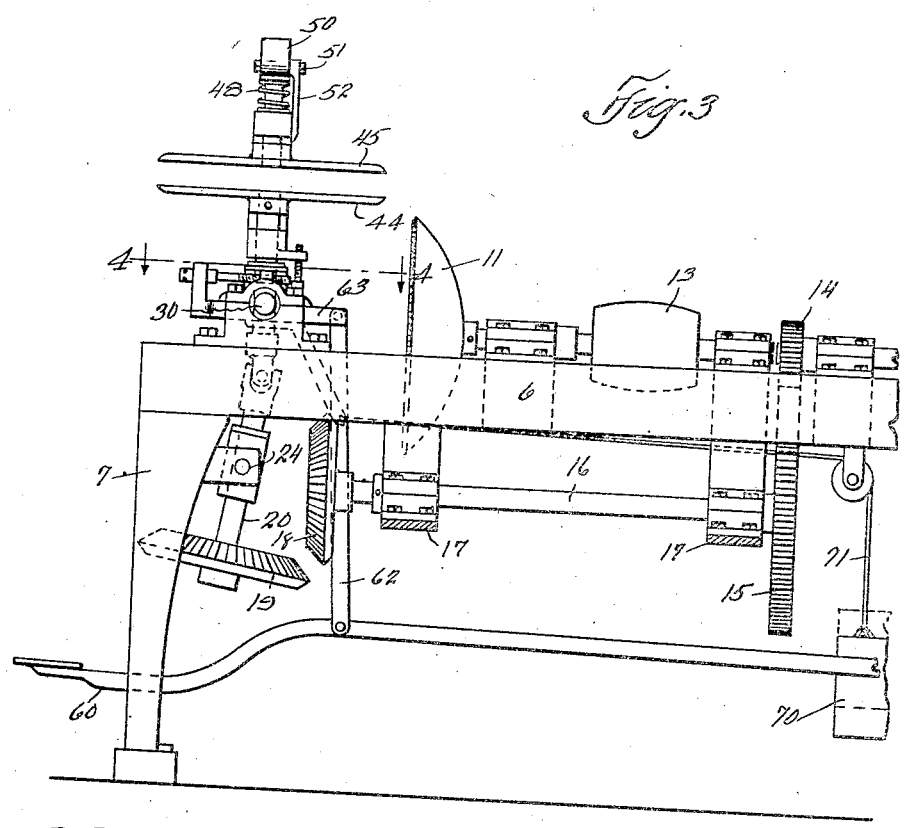

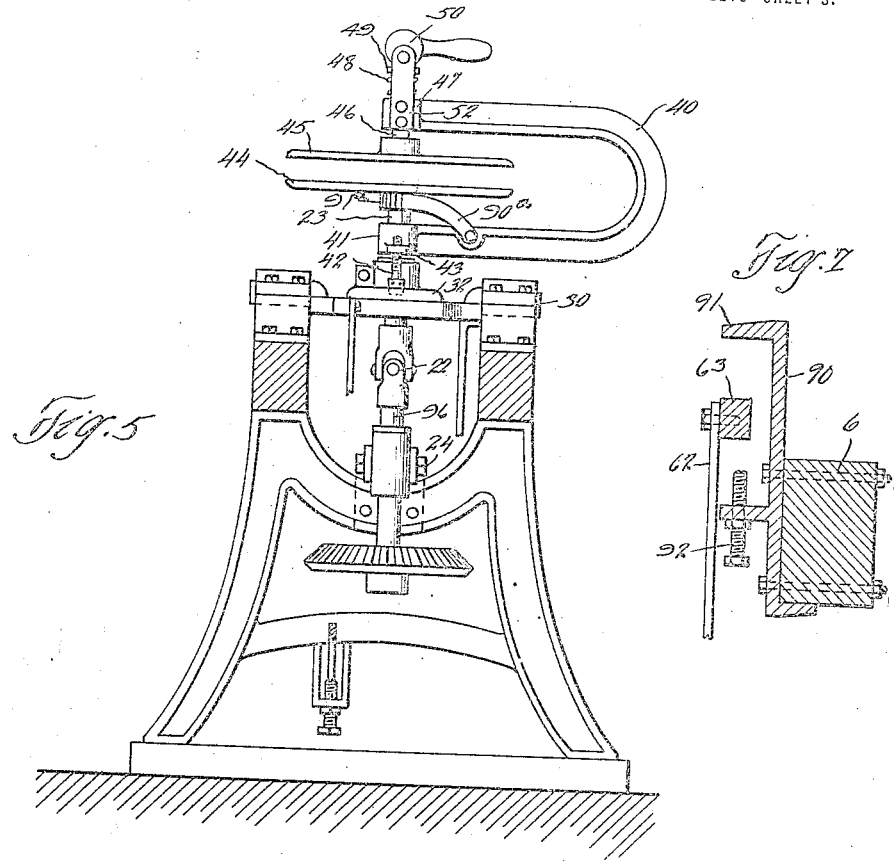
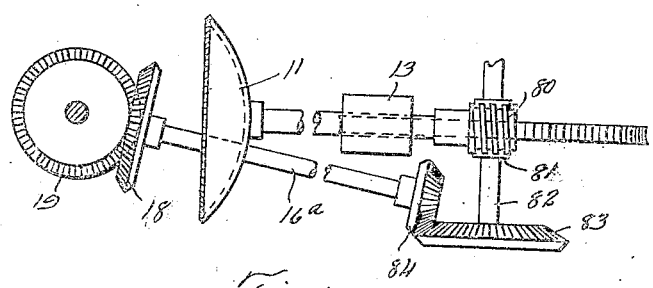

TIMOTHY F. WARD, OF EARLEYS, NORTH CAROLINA.

BARREL-HEAD MACHINE.

1,351,934.  Specification of Letters Patent.  Patented Sept. 7, 1920.

Application filed December 5, 1919. Serial No. 342,580.

*To all whom it may concern:*

Be it known that I, TIMOTHY F. WARD, a citizen of the United States, residing at Earleys, in the county of Hertford and State of North Carolina, have invented certain new and useful Improvements in Barrel-Head Machines, of which the following is a specification.

This invention relates to machines for sawing barrel heads or other circular work, and has for its object to provide an improved machine in which the work is presented to a concave circular saw and bevel cutter by means of an oscillating or swinging clamp containing rotary heads which are driven by a shaft which is operated by means of gears which can be swung into or out of engagement with each other, to start or stop the rotation of the work. The shaft which carries the work includes a universal joint which permits the oscillation of the head incident to the movement of the work to and from the saw.

The operation may be conveniently controlled by means of a treadle, leaving the hands of the operator free to place and remove the stock after each operation. This saves considerable time and greatly increases the capacity of the machine. Various adjustments of the operating parts are possible, as will be more fully explained hereinafter.

One form of the machine is illustrated in the accompanying drawings in which Figure 1 is a side elevation. Fig. 2 is a plan. Fig. 3 is a side elevation as in Fig. 1 but with the parts in different position. Fig. 4 is an enlarged detail in plan of the oscillating head which supports the work holder and its driving shaft. Fig. 5 is a section on the line 5—5 of Fig. 1. Fig. 6 is a detail of a modified form of drive. Fig. 7 is a section on the line 7—7 of Fig. 4.

The bed of the machine conveniently consists of two side sills 6 supported by end frames or legs 7 and connected by cross sills 8 which support the shafts and other operative parts. The saw arbor or shaft 9 is mounted in bearings 10 on the cross pieces 8 and carries the concave circular saw and cutter head 11 at one end, and a driving pulley 13 to which a driving belt (not shown) may be applied. Another shaft 9ª is driven by a belt (not shown) on a pulley 12 and carries a pinion 14 meshing with a gear 15 on the end of a shaft 16 supported in bearings by hangers 17 depending from the bed. At its front end the shaft 16 has a beveled gear 18 which is adapted to mesh with a beveled gear 19 on the lower end of an upright shaft which drives or carries the work holder. This upright shaft consists of a lower section 20 which is connected by universal joint 22 to an upper section 23. The lower section 20 is supported between its ends by a box 26 which has trunnions 24 mounted in the arms of a yoke 25 supported by one of the end frames 7, so that the shaft section 20 may swing in a vertical plane to engage or disengage the beveled gears 19 and 18 and thereby start or stop the rotation of the upright shaft. In Fig. 1 the gears are shown engaged and in Fig. 3 they are shown disengaged.

The upper shaft section 23 is carried in a bushing 27 which is fixed by a set screw 28 in an oscillating head 29 which is provided with trunnions 30 at its opposite sides which are mounted to swing in boxes 31 resting on the sills 6. An adjustment of the shaft toward and from the saw 11 is provided for by means of a collar 32 which rests on the annular head 29 and is adjusted by means of a screw 33 tapped through a lug 34 on the collar which is then fixed at adjustment by clamping screws 35 which are carried by lugs 36 on the collar and extend through slots 37 in the head 29. The central opening in the head 29 is large enough to permit some lateral shift of the collar 32 in line with the axis of the saw.

The work holder comprises a U-frame 40 the lower arm of which is provided with an eye 41 through which the shaft 23 extends, said eye being supported by screw 42 which is tapped through a lug 43 on the eye and rests at its head upon the collar 32. By adjusting the screw 42 the U-frame can be raised or lowered. Upon the upper end of the shaft section 23 is mounted one clamping disk 44, the other disk 45 has a stub shaft 46 which extends through a bearing 47 in the upper arm of the U-frame, and is normally raised by a coil spring 48 bearing against the collar 49 on the upper end of the stub 46 and may be lowered by a cam 50 which turns on a pin 51 carried by a bracket 52 secured to the eye 47. When the cam is swung over it depresses the disk 45 and clamps the stock against the opposite disk 44. These disks are so positioned that the stock held thereby is presented at an angle to the saw and cutter head 11, so that the saw and cutters will cut the chamfers on the barrel head.

The work is rocked to and from the saw by a treadle 60 which is pivoted at 61 and connected by a link 62 to an arm 63 projecting from the head 29, and when the treadle is released the head is rocked in the opposite direction, or away from the saw by a weight 70 which is connected by a rope 71 passing over a guide pulley 72 to an arm 73 depending from the head 29. The rocking movement of the head is limited by a bracket 90 bolted to one of the sills 6 and provided with a lug 91 against which the arm 63 stops at the limit of its upward swing, and with an adjustable screw 92 against which the arm stops when swung down, and the adjustment of the screw enables the amount of bevel on the barrel head to be varied.

In Fig. 6 a modified drive is shown. Instead of the spur gearing 14 and 15, I provide a worm 80 on the saw arbor which drives a worm gear 81 on a shaft 82 provided with a beveled gear 83 which meshes with a beveled pinion 84 on a shaft 16ª which drives the beveled gear 18 and its companion 19, the other parts being as above described.

In operation the upright shaft and work holder will normally stand in the position shown in Fig. 3, because of the weight 70, and in this position the pieces of stock are placed between the disks 44 and 45 and clamped by throwing over the cam 50. Then the treadle 60 is depressed. This swings the head and the work holder toward the saw, as shown in Fig. 1. By the same movement the lower shaft section 30 is swung on its pivots 24 to mesh the gears 19 and 18, this movement being permitted by the universal joint 22. Thereby the upright shaft is caused to rotate as the work is presented to the saw, which thus cuts the head in a circle and produces the desired chamfer at the edge. It will be appreciated that the speed of rotation of the work holder is relatively low. After the head is cut the treadle is released and the weight restores the parts to original position, the gear 19 swinging out of mesh from the gear 18. To prevent spinning of the upright shaft I provide a spring 90ª fastened to the U-frame which presses against the toothed wheel or ratchet 91ª on the shaft 23. To accommodate the variation in length or distance between the two sections of the upright shaft incident to the swing at the universal joint 22 one or both members of that joint are connected to the shaft sections by the usual splined or squared connection indicated at 96.

It will be obvious that by adjusting the collar 32 as above described the upright shaft may be shifted toward or from the saw, thereby accommodating heads of different sizes or varying the angle at which the work is presented to the saw.

The invention is not limited to the particular machine shown and described but may be embodied in various other forms.

I claim:—

1. The combination with a saw, of a shaft formed in two sections connected by a flexible joint, each of said sections being pivotally mounted between its ends to swing in a plane parallel to the axis of the saw, one section being provided with a work holder and the other section being provided with a driving device engageable or disengageable by the swing thereof, and means for adjusting the section provided with the work holder radially of said work holder.

2. The combination with a saw, of an upright rotary shaft formed in upper and lower sections connected by a flexible joint, each of said sections being pivotally mounted between its ends to swing in a vertical plane parallel to the axis of the saw, the upper section being provided with a substantially horizontal workholder and the lower section being provided with a driving device engageable or disengageable by the swing thereof.

3. The combination with a saw, of a rotary shaft, a work holder carried by the shaft and arranged to swing therewith toward and from the saw, a pivoted head supporting the shaft, and means to adjust the shaft radially of the pivoted head, toward and from the saw.

4. The combination with a saw, of a rotary shaft, a work holder carried by the shaft and arranged to swing therewith toward and from the saw, a pivoted head supporting the shaft, and means to adjust the shaft radially of the pivoted head toward and from the saw, said means including a collar slidable across the head, through which collar the shaft extends.

5. The combination of a frame, a horizontal saw arbor thereon, a horizontal countershaft under the saw arbor, provided with a bevel gear, an upright shaft in the end of the frame, said shaft having upper and lower sections, the lower section being provided with a bevel gear which may be swung into or out of mesh with said bevel gear, a flexible joint between the two sections, a work holder carried by the upper section and adapted to swing therewith toward and from the saw, and a pivotal bearing support for each shaft section located between the ends of the respective sections.

In testimony whereof, I affix my signature in presence of two witnesses.

TIMOTHY F. WARD.

Witnesses:
V. D. STRICKLAND,
JAS. H. MITCHELL.